(12) United States Patent
Nakanishi

(10) Patent No.: US 8,790,802 B2
(45) Date of Patent: Jul. 29, 2014

(54) AIR BATTERY SYSTEM AND METHODS FOR USING AND CONTROLLING AIR BATTERY SYSTEM

(75) Inventor: Shinji Nakanishi, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 494 days.

(21) Appl. No.: 12/669,973

(22) PCT Filed: Jul. 24, 2008

(86) PCT No.: PCT/IB2008/002779
§ 371 (c)(1),
(2), (4) Date: Jan. 21, 2010

(87) PCT Pub. No.: WO2009/013629
PCT Pub. Date: Jan. 29, 2009

(65) Prior Publication Data
US 2010/0190043 A1  Jul. 29, 2010

(30) Foreign Application Priority Data
Jul. 24, 2007 (JP) ................. 2007-191887

(51) Int. Cl.
*H01M 10/44* (2006.01)
*H01M 2/12* (2006.01)
*H02J 7/04* (2006.01)
*H02J 7/16* (2006.01)

(52) U.S. Cl.
USPC .................. 429/50; 429/53; 320/147

(58) Field of Classification Search
CPC .................. H01M 2/12; H01M 10/44
USPC .......... 429/403, 407, 47–347; 700/286; 320/147
See application file for complete search history.

(56) References Cited

U.S. PATENT DOCUMENTS

| | | | |
|---|---|---|---|
| 2,275,281 A | 3/1942 | Berl | |
| 4,168,349 A | 9/1979 | Buzzelli | |
| 4,725,516 A * | 2/1988 | Okada et al. | 429/225 |
| 5,011,747 A * | 4/1991 | Strong et al. | 429/407 |
| 5,356,729 A * | 10/1994 | Pedicini | 429/407 |
| 5,930,907 A * | 8/1999 | Ogawa et al. | 33/366.11 |
| 6,635,379 B2 * | 10/2003 | Onishi et al. | 429/49 |
| 6,794,074 B2 * | 9/2004 | Vu et al. | 429/406 |
| 6,802,132 B1 * | 10/2004 | Olson | 33/366.15 |

(Continued)

FOREIGN PATENT DOCUMENTS

| | | |
|---|---|---|
| JP | 2002-516474 | 6/2002 |
| JP | 2003-7357 | 1/2003 |

(Continued)

*Primary Examiner* — Patrick Ryan
*Assistant Examiner* — Kiran Quraishi
(74) *Attorney, Agent, or Firm* — Finnegan, Henderson, Farabow, Garrett & Dunner, LLP

(57) ABSTRACT

An air battery system has a sealed air battery cell (10) having: an air electrode having an air electrode layer (4) containing a conductive material and an air electrode power collector (6) for collecting electric power from the air electrode layer; a negative electrode having a negative electrode layer (3) containing an negative electrode active material that adsorbs and releases metal ions and a negative electrode power collector (2) for collecting electric power from the negative electrode layer; a separator (7) provided between the air electrode layer and the negative electrode layer; and a sealed air battery case (1*a*, 1*b*). The air battery system also has a depressurization portion (20) that reduces the internal pressure of the sealed air battery cell to below the atmospheric pressure.

10 Claims, 6 Drawing Sheets

(56) References Cited

U.S. PATENT DOCUMENTS

2002/0160247 A1* 10/2002 Tzeng et al. .................. 429/28
2008/0118848 A1* 5/2008 Lee et al. .................... 429/347
2009/0181305 A1* 7/2009 Nagayama et al. ........... 429/223

FOREIGN PATENT DOCUMENTS

| | | |
|---|---|---|
| JP | 3515492 | 1/2004 |
| JP | 2004-119278 | 4/2004 |
| JP | 3764623 | 1/2006 |

* cited by examiner

AIR BATTERY SYSTEM AND METHODS FOR USING AND CONTROLLING AIR BATTERY SYSTEM

CROSS-REFERENCE TO RELATED APPLICATIONS

This application is a national phase application of International Application No. PCT/IB2008/002779, filed Jul. 24, 2008, and claims the priority of Japanese Application No. 2007-191887, filed Jul. 24, 2007, the contents of both of which are incorporated herein by reference.

FIELD OF THE INVENTION

The invention relates to an air battery system incorporating a sealed air battery cell and methods for using and controlling such an air battery system.

BACKGROUND OF THE INVENTION

Air batteries are nonaqueous batteries using air as a positive-electrode active material, and they have a relatively high energy density and are easy to be made small in size and light in weight, which are desirable. When metal Li is used as a negative-electrode active material of such an air battery, the following reactions (1) to (4) occur.

DISCHARGED STATE

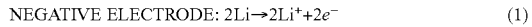

NEGATIVE ELECTRODE: $2Li \rightarrow 2Li^+ + 2e^-$ (1)

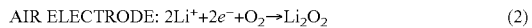

AIR ELECTRODE: $2Li^+ + 2e^- + O_2 \rightarrow Li_2O_2$ (2)

SOME AMOUNT OF $Li_2O$ MAY BE GENERATED.
CHARGED STATE

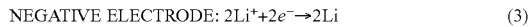

NEGATIVE ELECTRODE: $2Li^+ + 2e^- \rightarrow 2Li$ (3)

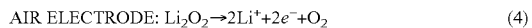

AIR ELECTRODE: $Li_2O_2 \rightarrow 2Li^+ + 2e^- + O_2$ (4)

Air batteries are structured to take in oxygen from the outside and thus they usually have porous membranes having a high oxygen permeability. However, in the case of such open-type air batteries, the moisture in the air is also drawn into the air battery together with oxygen, and it deteriorates the air battery. Further, open-type air batteries have a drawback that electrolyte tends to evaporate easily. In view of such drawbacks of air batteries, sealed air batteries have been proposed.

For example, Japanese Patent No. 3764623 describes a sealed oxygen lithium secondary battery having an exterior member in which gas containing pressurized oxygen is enclosed. According to this battery, because the battery is sealed, the moisture in the air does not enter the battery, which enhances the storability of the battery and prolongs the cycle life of the battery. However, such sealed oxygen lithium secondary batteries have the following drawbacks.

That is, because oxygen is produced at the air electrode of the battery upon power charge as is known from the reaction (4) indicated above, if pressurized oxygen is enclosed in the battery case, the oxygen partial pressure in the battery case becomes high, and it makes the reaction (4) less likely to occur, leading to a decrease in the power charge efficiency.

Meanwhile, Published Japanese Translation of PCT application No. 2002-516474 describes a metal/oxygen battery in which oxygen is concentrated using an oxygen concentrator and the obtained high-concentration oxygen is supplied to the negative electrode. According to this technology, in order to provide a high output battery, the concentration of oxygen to be supplied to the battery is controlled in accordance with the target output current of the battery. Further, Japanese Patent Application Publication No. 2003-07357 (JP-A-2003-07357) describes a nonaqueous electrolyte air battery using a nonaqueous electrolyte solution in which carbon oxide is dissolved (claim 3). According to this technology, by dissolving carbon oxide in the nonaqueous electrolyte solution, direct oxidization of the negative electrode is minimized, and therefore the cycle characteristic of the battery improves.

SUMMARY OF THE INVENTION

The invention provides an air battery system and methods for using and controlling an air battery system, which prevent the moisture in air from entering the air battery and thus provides a high power discharge, etc.

The first aspect of the invention relates to an air battery system, comprising: (i) a sealed air battery cell having: an air electrode having an air electrode layer containing a conductive material and an air electrode power collector for collecting electric power from the air electrode layer; a negative electrode having a negative electrode layer containing an negative electrode active material that adsorbs and releases metal ions and a negative electrode power collector for collecting electric power from the negative electrode layer; a separator provided between the air electrode layer and the negative electrode layer; and a sealed air battery case; and (ii) a depressurization portion that reduces the internal pressure of the sealed air battery cell to below the atmospheric pressure.

According to the air battery system of the first aspect of the invention, due to the depressurization portion, the air battery system can be charged with electric power in a depressurized state. Charging the air battery in a depressurized state reduces the concentration of oxygen dissolved in the electrolyte solution and reduces the oxygen partial pressure in the sealed air battery cell, thus achieving a high power charge efficiency.

In the air battery system of the first aspect of the invention, the depressurization portion may be adapted to draw gas from the sealed air battery cell.

In this case, further, the air battery system may also have a gas feedback portion that returns the drawn gas to the sealed air battery cell. According to this structure, a high power charge efficiency can be achieved by reducing the internal pressure of the sealed air battery cell upon power charge, and a high power discharge efficiency can be achieved by boosting the internal pressure of the sealed air battery cell up to the original level upon power discharge.

In the air battery system described above, the gas feedback portion may be connected to the depressurization portion.

The above-described air battery system may further have a pressurization portion that boosts the internal pressure of the sealed air battery cell using oxygen gas. In this case, the concentration of oxygen dissolved in the electrolyte solution can be increased by boosting the internal pressure in the sealed air battery cell.

In the above-described air battery system, an electrolyte solution may be provided in the sealed air battery cell such that the air electrode layer and the negative electrode layer are always filled with the electrolyte solution regardless of a change in the volume of the air electrode and a change in the volume of the negative electrode. In this case, a shortage of the electrolyte solution, which may cause an increase in the internal resistance of the sealed air battery cell, can be reliably prevented.

The above-described air battery system may be such that the level of the electrolyte solution in the sealed air battery cell is set so as to be higher than the uppermost face of the air electrode layer and the uppermost face of the negative electrode layer even if the level of the electrolyte solution lowers down to a lowest level due to a change in the volume of the air electrode and due to a change in the volume of the negative electrode when the sealed air battery cell is charged with electric power or when electric power is discharged from the sealed air battery cell.

The above-described air battery system may be such that the depressurization portion is made active when the air battery system is charged with electric power or when the air battery system is not operating.

The above-described air battery system may be such that the gas feedback portion is made active when electric power is discharged from the air battery system.

The above-described air battery system may be such that the pressurization portion is made active when electric power is discharged from the air battery system.

The second aspect of the invention relates to a method for using an air battery system. This method includes: reducing the internal pressure of the sealed air battery cell when the air battery system is charged with electric power; and boosting the internal pressure of the sealed air battery cell when electric power is discharged from the air battery system.

The third aspect of the invention relates to a method for controlling an air battery system incorporating a sealed air battery cell having: an air electrode having an air electrode layer containing a conductive material and an air electrode power collector for collecting electric power from the air electrode layer; a negative electrode having a negative electrode layer containing an negative electrode active material that adsorbs and releases metal ions and a negative electrode power collector for collecting electric power from the negative electrode layer; a separator provided between the air electrode layer and the negative electrode layer; and a sealed air battery case. This method includes: reducing the internal pressure of the sealed air battery cell when the air battery system is charged with electric power or when the air battery system is not operating; and boosting the internal pressure of the sealed air battery cell when electric power is discharged from the air battery system.

As such, the invention provides air battery systems that can prevent the moisture in air from entering the air battery and thus achieves a high power discharge efficiency, etc.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, air battery systems and methods for using air battery systems according to example embodiments of the invention will be described in detail.

First, an air battery system according to an example embodiment of the invention will be described. This air battery system is constituted of a sealed air battery cell and a depressurization portion. The sealed air battery cell has an air electrode, a negative electrode, and a separator provided between the air electrode and the negative electrode. The air electrode has an air electrode layer containing a conductive material and an air electrode power collector for collecting electric power from the air electrode layer, and the negative electrode has a negative electrode layer that adsorbs and releases metal ions and a negative electrode power collector for collecting electric power from the negative electrode layer. The depressurization portion is operable to reduce the internal pressure of the sealed air battery cell down to below the atmospheric pressure.

Having the depressurization portion, the air battery system of the embodiment can be charged in a depressurized state. Charging in a depressurized state reduces the concentration of oxygen dissolved in the electrolyte solution and the partial pressure of oxygen in the sealed air battery cell, which improves the power charge efficiency. Further, due to the depressurization portion, the air battery system can be maintained in a depressurized state when it is not operating, and this suppresses the self-discharge from the air battery system, which is desirable. In air battery systems of the related art, oxygen is enclosed in the air battery cell at a high pressure. However, if the internal pressure of the air battery cell is continuously high, it facilitates self-discharge from the air battery cell when the air fuel system is not operating, which is undesirable. In view of this, in the air battery system of the example embodiment, the air battery cell is maintained in a depressurized state when the air battery system is not operating, whereby the self-discharge from the air battery cell is suppressed. Further, in the air battery system of the example embodiment, because the air battery cell is of a sealed type, moistures in the air do not enter the air battery cell, and therefore it has a good cycle characteristic, etc.

Figure 1:
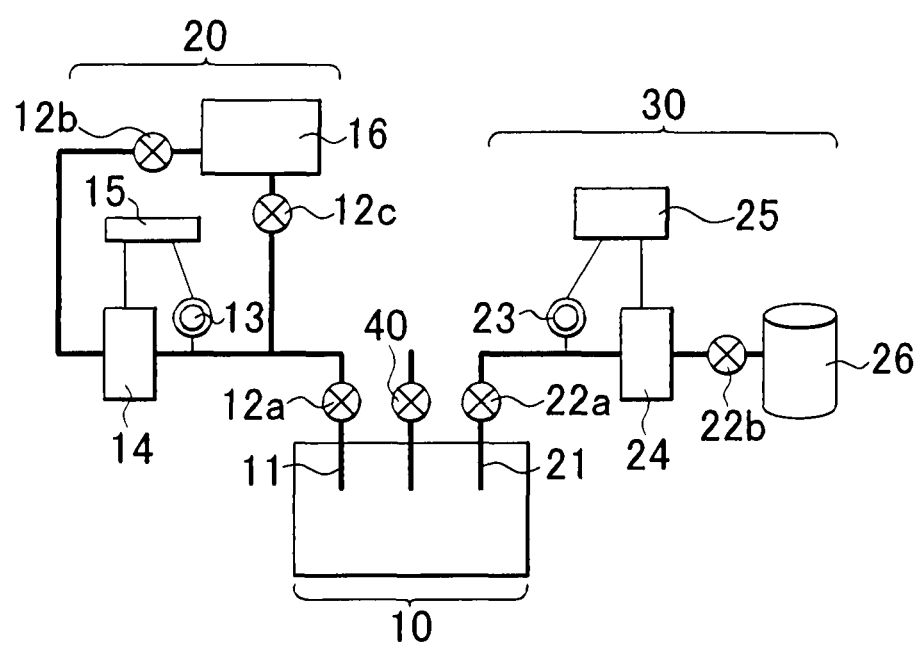
FIG. 1 is a view illustrating an air battery system according to an example embodiment of the invention.

Hereinafter, the air battery system of the example embodiment of the invention will be described with reference to the drawings. FIG. 1 shows one example of the air battery system of the example embodiment of the invention. This air battery system has a sealed air battery cell 10, a depressurization portion 20 for reducing the internal pressure of the sealed air battery cell 10 to below the atmospheric pressure, and a pressurization portion 30 for increasing the internal pressure of the sealed air battery cell 10 using oxygen gas.

In the depressurization portion 20, a hose 11 extends from the inside of the sealed air battery cell 10 to a depressurization gauge (pressure meter) 13 and to a depressurization pump 14 via an electromagnetic valve 12*a*. The depressurization gauge 13 is connected to a detector 15 so that the signals output from the depressurization gauge 13 are provided to the depressurization pump 14. The depressurization pump 14 is connected to a gas storage portion 16 for storing discharged gas via an electromagnetic valve 12*b*. When necessary, the gas stored in the gas storage portion 16 is returned to the sealed air battery cell 10 via an electromagnetic valve 12*c*.

According to this structure, the gas drawn into the sealed air battery cell 10 is stored in the gas storage portion 16 and the gas is returned to the sealed air battery cell 10 as needed (gas feedback structure). Thus, upon power charge of the sealed air battery cell 10, the internal pressure of the sealed air battery cell 10 is reduced to achieve a high power charge efficiency, and on the other hand, upon power discharge from the sealed air battery cell 10, the internal pressure of the air battery cell is increased up to the original level to achieve a high power discharge efficiency. More specifically, for example, upon power discharge from the sealed air battery cell 10, the internal pressure of the air battery cell is increased. Then, before starting power charge, the internal pressure of the air battery cell is reduced down to the atmospheric pressure or lower using the depressurization portion, so that the power charge is performed in a depressurized state. Then, when power discharge is performed again, the internal pressure of the air battery cell is increased and then the power discharge is performed. In this manner, the power charge and the power discharge can be both performed efficiently.

On the other hand, in the pressurization portion 30, a hose 21 extends from the inside of the sealed air battery cell 10 to a pressurization gauge (pressure meter) 23 and to a pressurization pump 24 via an electromagnetic valve 22a. The pressurization gauge 23 is also connected to a detector 25 so that the signals output from the pressurization gauge 23 are provided to a pressurization pump 24. The pressurization pump 24 is also connected to a gas storage portion 26 for storing oxygen, etc.

Further, in the air battery system shown in FIG. 1, at the start of power discharge, if the internal pressure of the sealed air battery cell 10 is lower than a predetermined pressure, the pressurization gauge 23 transmits signals to the detector 25, thereby activating the pressurization pump 24 to deliver gas from the gas storage portion 26 to the sealed air battery cell 10 via the hose 21. Then, when the internal pressure of the sealed air battery cell 10 becomes higher than the predetermined pressure, the pressurization pump 24 stops. When the power discharge has been finished, the electromagnetic valve 40 is opened to release the gas from the sealed air battery cell 10, whereby the internal pressure of the sealed air battery cell 10 decreases down to the atmospheric pressure.

On the other hand, when the power charge is to be performed, if the internal pressure of the sealed air battery cell 10 is higher than the predetermined pressure, the depressurization gauge 13 transmits signals to the detector 15, thereby activating the depressurization pump 14 to reduce the internal pressure of the sealed air battery cell 10. When the internal pressure of the sealed air battery cell 10 becomes lower than the predetermined pressure, the depressurization pump 14 stops and the electromagnetic valve 12a is closed. When the power charge has been finished, the electromagnetic valve 12c and the electromagnetic valve 12a are opened to return the gas in the gas storage portion 16 to the sealed air battery cell 10.

Figure 2A:
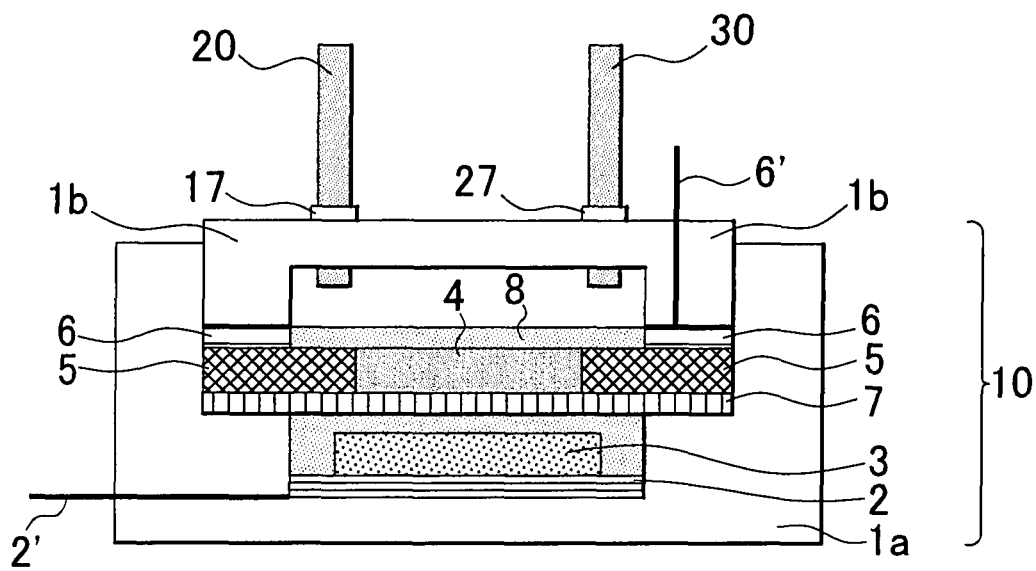
FIG. 2A and FIG. 2B are views illustrating the structure of the sealed air battery cell shown in FIG. 1.
Figure 2B:
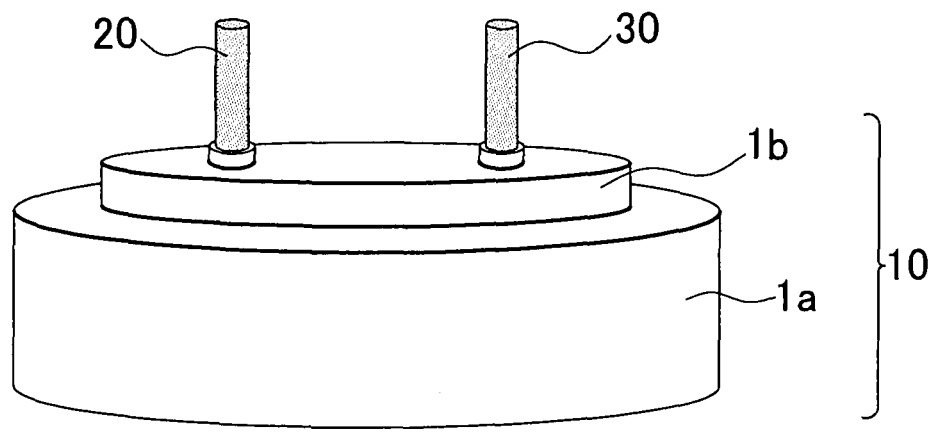

FIG. 2A and FIG. 2B illustrate the structure of the sealed air battery cell 10. Referring to FIG. 2A, the sealed air battery cell 10 is constituted of a negative electrode power collector 2 formed on the inner bottom face of a lower insulative case 1a, a negative electrode lead 2' connected to the negative electrode power collector 2, a negative electrode layer 3 made of metal Li and formed on the negative electrode power collector 2, an air electrode layer 4 containing carbon, an air electrode mesh 5 and an air electrode power collector 6 both used for collecting electric power from the air electrode layer 4, an air electrode lead 6' connected to the air electrode power collector 6, a separator 7 provided between the negative electrode layer 3 and the air electrode layer 4, an upper insulative case 1b, and electrolyte solution 8 in which the negative electrode layer 3 and the air electrode layer 4 soaked. FIG. 2B is a perspective view of the exterior of the sealed air battery cell 10. In the following, the materials of respective portions of the air battery system and its structure will be described separately.

1. Materials of Air Battery System

First, the materials of the air battery system will be described. The air battery system of this example embodiment has at least a sealed air battery cell and a depressurization portion. Further, the air battery system may have a pressurization portion if necessary. In the following, (1) the materials of the sealed air battery cell, (2) the materials of the depressurization portion, and (3) the materials of the pressurization portion will be described separately.

(1) First, the materials of the sealed air battery cell will be described. The sealed air battery cell of this example embodiment of the invention has an air electrode, a negative electrode, a separator, an electrolyte solution, and a sealed air battery case. The sealed air battery cell of this example embodiment may either be a primary battery or a secondary battery. In this example embodiment of the invention, preferably, it is a secondary battery.

(i) The sealed air battery case contains the air electrode, the negative electrode, the separator, and the electrolyte solution. Further, in this example embodiment of the invention, "sealed air battery case" refers to a battery case having no openings through which air (oxygen) enter the battery case from the outside. The sealed air battery case may be formed in any shape as long as it can contain the above-described components. For example, it may be formed in the shape of a coin, in a flat shape, in a cylindrical shape, and so on. For example, the material of the sealed air battery case may be selected from among the materials for battery cases of typical lithium-ion batteries.

(ii) The air electrode in this example embodiment of the invention has an air electrode layer containing a conductive material and an air electrode power collector for collecting electric power from the air electrode layer. In this example embodiment of the invention, oxygen reacts with metal ions at the air electrode, whereby metal oxides are produced on the surface of the conductive material. As such, the air electrode layer have gaps allowing sufficient movement of the electrolyte solution that is the carrier of oxygen and metal ions.

Any material may be used as the above-stated conductive material as long as it is conductive. For example, carbon material is used. This carbon material may either be porous or non-porous. In this example embodiment of the invention, preferably, porous carbon material is used because it has a relatively large superficial area and therefore provides many reaction sites. Mesoporouscarbon is one example of porous carbon materials. Graphite, acetylene black, carbon nanotubes, and carbon fibers are examples of non-porous carbon materials. Further, the conductive material may be a conductive material carrying catalyst, which is, for example, cobalt phthalocyanine or manganese dioxide.

In this example embodiment of the invention, although it is sufficient for the air electrode layer to contain a conducive material, preferably, the air electrode layer also contains a bonding agent for fixing the conductive material. The bonding agent is, for example, polyvinylidene fluoride (PVdF) or polytetrafluoroethylene (PTFE). The amount of the bonding agent contained in the air electrode layer may be set as needed. Preferably, said amount is set to 30 wt % or lower, more preferably to 1 to 10 wt %.

The air electrode collector may be made of any material as long as it is conductive. For example, it may be selected from among stainless steel, nickel, aluminum, iron, and titanium. The air electrode power collector may be formed, for example, in the shape of a foil, in the shape of a plate, or in a mesh (grid) pattern. In the example embodiment of the invention, preferably, the air electrode layer is formed in a mesh pattern because it provides a relatively high power collection efficiency. In this case, normally, the mesh-pattern air electrode collector is provided in the air electrode layer. Further, the sealed air battery cell 10 may have another air electrode power collector (e.g., foil-shaped power collector) to collect electric charge collected by the mesh-pattern air electrode power collector. Further, in the example embodiment, the air electrode power collector may be incorporated in the battery case, which will be described later.

(iii) The negative electrode used in this example embodiment of the invention has a negative electrode layer containing a negative electrode active material that adsorbs and releases metal ions and a negative electrode power collector for collecting electric power from the negative electrode layer.

The negative electrode active material may be any material that adsorbs and releases metal ions. The metal ions may be any metal ions that can produce electromotive force by moving between the air electrode and the negative electrode. More specifically, the metal ions are, for example, lithium ions, sodium ions, aluminum ions, magnesium ions, and cesium ions. Among these, lithium ions are especially preferred.

The aforementioned negative electrode active material that adsorbs and releases lithium ions may be selected from among various negative electrode active materials used for typical lithium ions, which include, for example, metal lithium, lithium alloys, metal oxides, metal sulfides, metal nitrides, and carbon materials (e.g., graphite). Among these, metal lithium and carbon materials are especially preferred, and metal lithium is preferred between the two. This is because upon power discharge from the sealed air battery cell 10, metal lithium liquates out as lithium ions and thus its volume largely changes.

In this example embodiment of the invention, although it is sufficient for the negative electrode layer to contain at least a negative electrode active material, it may also contain a bonding agent for fixing the negative electrode active material. The type of the bonding agent and its amount have already been explained in (ii) above, therefore they are not explained here again.

The negative electrode power collector may be made of any material as long as it is conductive. For example, it may be selected from among copper, stainless steel, and nickel. The negative electrode power collector may be formed in the shape of a foil, the shape of a plate, or in a mesh pattern (grid pattern). In this example embodiment of the invention, the negative electrode power collector may be incorporated in the battery case, which will be described later.

(iv) In this example embodiment of the invention, the separator used is provided between the air electrode layer and the negative electrode layer. The separator may be formed in any shape and made of any material as long as it properly separates the air electrode layer and the negative electrode layer and properly keeps the electrolyte solution. For example, the separator may be a porous membrane made of polyethylene or polypropylene, may be formed of non-woven fabrics (e.g., non-woven resin fabrics, non-woven glass fiber fabrics), or may be made of a polymer material used for lithium polymer batteries.

(v) In the example embodiment of the invention, the electrolyte solution is produced by dissolving electrolyte in an organic solvent. The electrolyte is, for example, inorganic lithium salts (e.g., $LiPF_6$, $LiBF_4$, $LiClO_4$, $LiAsF_6$) or organic lithium salts (e.g., $LiCF_3SO_3$), $LiN(CF_3SO_2)_2$, and $LiC(CF_3SO_2)_3$).

The organic solvent may be any organic solvent as long as it can dissolve the electrolyte. However, an organic solvent having a high oxygen dissolubility is preferably used because the oxygen dissolved in the organic solvent can be utilized for the reactions at the air battery cell. The organic solvent is, for example, ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2-dimethoxymethane, 1,3-dimethoxypropane, diethyl ether, tetrahydrofuran, and 2-methyltetrahydrofuran. In this example embodiment of the invention, preferably, a mixture solvent obtained by mixing EC or PC with DEC or EMC is used. Further, in the example embodiment of the invention, for example, a low-volatile liquid, such as an ionic liquid, may be used as the electrolyte solution. The use of a low-volatile liquid minimizes the reduction of the electrolyte solution due to volatilization and thus prolongs the product life.

(2) Next, the depressurization portion of the example embodiment of the invention will be described. The depressurization portion is a portion for reducing the internal pressure of the sealed air battery cell down to below the atmospheric pressure. The structure of the depressurization portion is not limited to any specific structure. That is, the depressurization portion may have any structure as long as it can reduce the internal pressure of the sealed air battery cell down to below the atmospheric pressure. For example, the depressurization portion may be a depressurization pump.

The depressurization portion has a gas-drawing portion via which gas is drawn out of the sealed air battery cell and a depressurization pump used to draw gas from the sealed air battery cell. Further, the depressurization portion may have, if necessary, a depressurization gauge (pressure meter), a detector for detecting depressurization, an electromagnetic valve, a ball valve, and so on. In view of controlling the degree of depressurization, preferably, the depressurization portion has a depressurization gauge and a detector.

The gas-drawing portion of the depressurization portion is, for example, a tubular member. A proper inner diameter of the tubular member differs depending upon the dimensions of the sealed air battery cell, etc. For example, preferably, it is 3 to 30 mm more preferably, 6 to 15 mm. Further, the material of the gas-drawing portion is not limited to any specific material. For example, it may be made of resin, rubber, metal, or the like.

The depressurization portion may have any structure as long as it can reduce the internal pressure of the sealed air battery cell to below the atmospheric pressure. However, preferably, the depressurization portion is operable to reduce the internal pressure of the sealed air battery cell down to 0.0933 MPa (700 mmHg) or lower, more preferably, to 0.0400 to 0.0800 MPa (300 to 600 mmHg). Here, it should be noted that if the internal pressure of the sealed air battery cell is made lower than 0.0400 MPa (300 mmHg), it may make it difficult to maintain the sealing of the sealed air battery cell sealed or may facilitate volatilization of the electrolyte solution, although it enables smooth reactions in the sealed air battery cell.

(3) Next, the pressurization portion of the example embodiment of the invention will be described. Preferably, the air battery system of the example embodiment of the invention has the pressurization portion operable to boost the internal pressure of the sealed air battery cell 10 using oxygen gas. As is known from the reaction (2) indicated above, oxygen is consumed upon power discharge from the sealed air battery cell. Therefore, if oxygen is supplied to the sealed air battery cell upon power discharge, it facilitates the reaction (2) and thus improves the power discharge efficiency.

The pressurization portion has a gas storage portion for storing oxygen gas and a gas supply portion via which oxygen gas is supplied into the sealed air battery cell. Further, the pressurization portion may also have, if necessary, a pressurization gauge. (pressure meter), a detector for detecting pressurization, an electromagnetic valve, a ball valve, and so on. In view of controlling the degree of pressurization, preferably, the pressurization portion has a pressurization gauge and a detector.

The gas supply portion of the pressurization portion is, for example, a tubular member. A proper inner diameter of the tubular member differs depending upon the dimensions of the sealed air battery cell, etc. For example, preferably, it is 3 to 30 mm, more preferably, 6 to 15 mm. Further, the material of the gas supply portion is not limited to any specific material. For example, it may be made of resin, rubber, metal, or the like.

The pressurization portion may have any structure as long as it can boost the internal pressure of the sealed air battery cell to above the atmospheric pressure. However, preferably, the pressurization portion is structured to boost the internal pressure of the sealed air battery cell up to 0.107 MPa (800 mmHg) or higher, more preferably, to 0.152 to 0.304 MPa (1140 to 2280 mmHg).

The gas supplied from the pressurization portion to the sealed air battery cell may be any gas as long as it contains oxygen. That is, it may either be an oxygen gas or a mixture of oxygen and other gas or gases. In view of facilitating power-discharge reactions, an oxygen gas is preferably used. On the other hand, in view of controlling power-discharge reactions or controlling the oxygen concentration, a mixture gas is preferably used.

Examples of gases that can be mixed with oxygen include nitrogen gas, argon gas, and helium gas. Among these, argon gas or helium gas is preferably used in view of the reactivity with metal lithium, and nitrogen gas is preferably used in view of cost reduction. The ratio of oxygen in the mixture gas is not specifically limited. For example, it is 10 vol % or higher, preferably 20 vol % or higher but lower than 100 vol %, and more preferably 90 vol % or higher but lower than 100 vol %.

2. Configuration of Air Battery System

Next, the configuration of the air battery system of the example embodiment of the invention will be described. The air battery system of the example embodiment has at least the sealed air battery cell and the depressurization portion, and optionally the pressurization portion. In the following, the configuration of the air battery system of the example embodiment will be described in (1) the structure of the sealed air battery cell, (2) the arrangement of the depressurization portion, and (3) the arrangement of the pressurization portion.

(1) First, the structure of the sealed air battery cell of the example embodiment will be described. The structure of the sealed air battery cell of the example embodiment is not specifically limited, that is, it may have any structure as long as it has the air electrode, the negative electrode, the separator, the sealed air battery case, and the electrolyte solution.

Preferably, the sealed air battery cell is structured such that the air electrode layer and the negative electrode layer are always soaked in the electrolyte solution even when the volumes of the electrodes change upon power charge or upon power discharge and power charge. In this case, a shortage of the electrolyte solution, which may cause an increase in the internal resistance of the sealed air battery cell, can be reliably prevented.

Figure 3A:
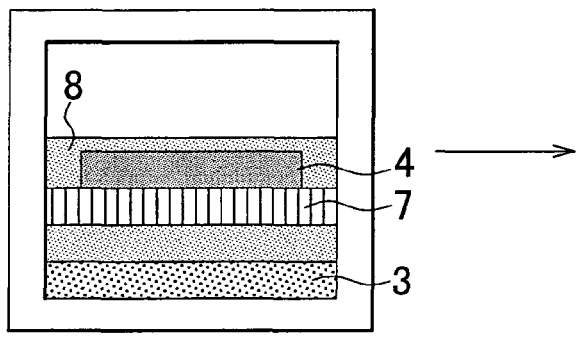
FIGS. 3A and 3B are views illustrating how the internal resistance of the sealed air battery cell increases as a result of a shortage of the electrolyte solution.
Figure 3B:
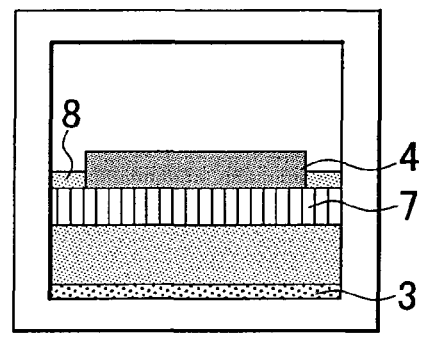

Hereinafter, with reference to FIG. 3, a description will be made of how the internal resistance of the sealed air battery cell increases due to a shortage of the electrolyte solution. The sealed air battery cell shown in FIG. 3A has the negative electrode layer 3 made of metal Li, the air electrode layer 4 containing carbon, the separator 7 provided between the negative electrode layer 3 and the air electrode layer 4, and the electrolyte solution 8 in which these components are soaked. According to the reactions (1) to (4) indicated above, Li liquates out in as lithium ions (the reaction (1)) at the negative electrode while lithium oxides are predicated from the air electrode (the reaction (2)). At this time, because the density of lithium oxides ($Li_2O_2$) is higher than the density of Li, the total volume of the air electrode and the negative electrode decreases by approx. 35%. As a result, as shown in FIG. 3B, the amount of the electrolyte solution 8 becomes insufficient, and therefore a portion of the air electrode 4 is not soaked in the electrolyte solution 8, causing an increase in the internal resistance of the sealed air battery cell.

The aforementioned electrode volume changes due to power discharge or due to power discharge and power charge refer to changes in the volume of each electrode (the air electrode and the negative electrode) that occurs due to differences in the densities of the components of the air electrode layer and the negative electrode layer when metal ions move between said layers upon power discharge or upon power discharge and power charge. If the sealed air battery cell of the example embodiment is a primary battery, changes in the volume of each electrode due to power discharge need to be considered, and on the other hand, if the sealed air battery cell of the example embodiment is a secondary battery, changes in the volume of each electrode due to power discharge and power charge need to be considered.

Figure 4A:
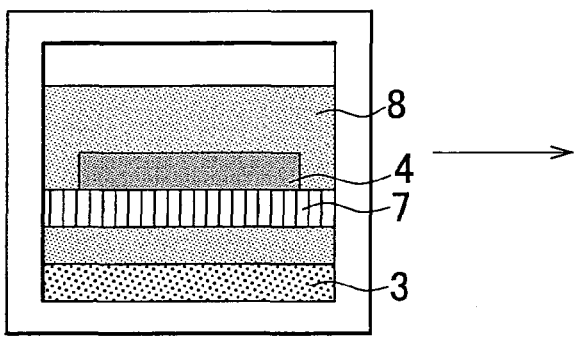
FIG. 4A and FIG. 4B are views illustrating a structure incorporating a relatively large amount of electrolyte solution.
Figure 4B:
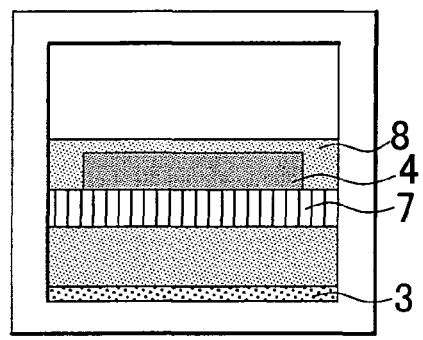

Any structure may be adopted to ensure that the air electrode layer and the negative electrode layer both remain soaked in the electrolyte solution even when the volume of the air electrode and/or the volume the negative electrode change due to power charge or due to power discharge and power charge. For example, a structure for circulating the electrolyte solution or a structure incorporating a relatively large amount of electrolyte solution may be adopted. In particular, the latter structure is preferable because it easily prevents an increase in the internal resistance of the sealed air battery cell due to a shortage of the electrolyte solution. More specifically, in a case where a large amount of electrolyte solution 8 is used as shown in FIG. 4A, even if the volumes of the electrodes change upon power discharge or upon power discharge and power charge and the level of the electrolyte solution 8 lowers, the air electrode layer 4 is still soaked in the electrolyte solution 8 as shown in FIG. 4B. Note that the elements in FIG. 4 that are identical to those identified by the same reference numerals in FIG. 3 are not described here again.

Thus, in the example embodiment of the invention, it is preferable that the level of the electrolyte solution in the sealed air battery cell be set so as to be higher than the uppermost face of the air electrode layer and the uppermost face of the negative electrode layer even when said level has lowered to the lowest level as a result of a change in the volume of each electrode. This can be achieved by setting the amount of the electrolyte solution, and thus a shortage of the electrolyte solution can be prevented. In a case where the negative electrode layer is made of metal Li, for example, lithium liquates out in the reactions upon power discharge from the sealed air battery cell, whereby the total volume of the air electrode and the negative electrode decreases. Therefore, the level of the electrolyte solution in the sealed air battery cell at the end of power discharge corresponds to the lowest level.

"The uppermost face of the air electrode layer and the uppermost face of the negative electrode layer" refers to the uppermost face of the air electrode layer only, to the uppermost face of the negative electrode layer only, or to both the uppermost face of the air electrode layer and the uppermost face of the negative electrode layer depending on the structure of the sealed air battery cell, as will be described in detail below with reference to FIG. 5.

Figure 5A:
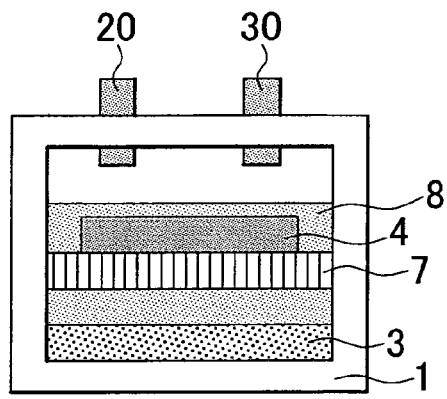
FIG. 5A to FIG. 5C are views illustrating the positional relation between the surface of the electrolyte solution and the uppermost face of the air electrode layer, etc.

FIG. 5A is a cross-sectional view schematically illustrating a case where the lowest level of the electrolyte solution is set to the uppermost face of the air electrode layer. In the sealed air battery cell shown in FIG. 5A, the negative electrode layer 3, the separator 7, and the air electrode layer 4 are stacked in this order on the bottom face of the battery case 1, and the lowest level of the electrolyte solution 8 in the sealed air battery cell is set higher than the uppermost face of the air electrode layer 4. In the case illustrated in FIG. 5A, the depressurization portion 20 and the pressurization portion 30 are provided at positions higher than the surface of the electrolyte solution 8 (i.e., spaces located higher than the surface of the electrolyte solution 8 in the sealed air battery cell).

Figure 5B:
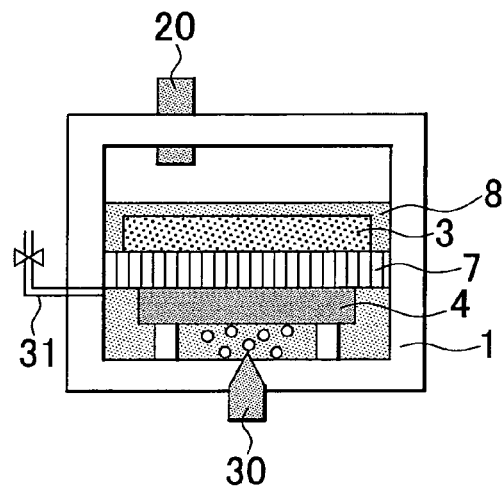

FIG. 5B is a cross-sectional view schematically illustrating a case where the lowest level of the electrolyte solution is set higher than the uppermost face of the negative electrode layer. In the sealed air battery cell shown in FIG. 5B, the air electrode layer 4, the separator 7, and the negative electrode layer 3 are stacked in this order on the bottom face of the battery case 1, and the lowest level of the electrolyte solution 8 is set higher than the uppermost face of the negative electrode layer 3. In the case illustrated in FIG. 5B, the depressurization portion 20 and the pressurization portion 30 are provided at positions higher than the surface of the electrolyte solution 8 (i.e., spaces located higher than the surface of the electrolyte solution 8 in the sealed air battery cell). The pressurization portion 30 is arranged at the bottom of the sealed air battery cell and is operable to boost the internal pressure of the sealed air battery cell by bubbling. Further, if necessary, a gas discharge portion 31 may be provided at the sealed air battery cell 10.

Figure 5C:
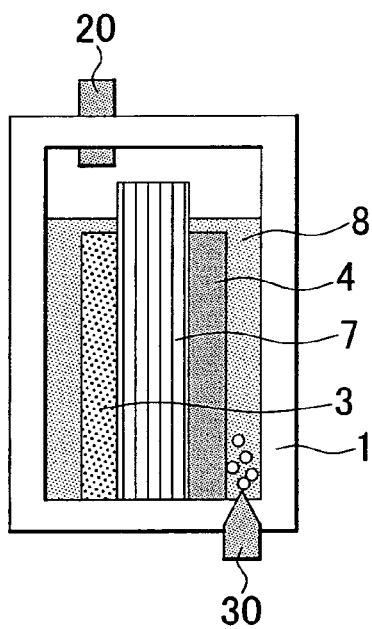

FIG. 5C is a cross-sectional view schematically illustrating a case where the lowest level of the electrolyte solution is set higher than the uppermost face of the air electrode layer and the uppermost face of the negative electrode layer. In the case illustrated in FIG. 5C, the sealed air battery cell is columnar having the separator 7, the negative electrode layer 3 provided on one side of the separator 7, and the air electrode layer 4 provided on the other side of the separator 7, and the lowest level of the electrolyte solution 8 is set higher than the uppermost face of the negative electrode layer 3 and than the uppermost face of the air electrode layer 4. In the case illustrated in FIG. 5C, the depressurization portion 20 and the pressurization portion 30 are provided at positions higher than the surface of the electrolyte solution 8 (i.e., spaces located higher than the surface of the electrolyte solution 8 in the sealed air battery cell). The pressurization portion 30 is arranged at the bottom of the sealed air battery cell and is operable to boost the internal pressure of the sealed air battery cell by bubbling.

In the example embodiment of the invention, preferably, the lowest level of the electrolyte solution in the sealed air battery cell is higher than the uppermost face of the air electrode layer and than the uppermost face of the negative electrode layer. The difference between the lowest level of the electrolyte solution and the uppermost face of the air electrode layer and the difference between the lowest level of the electrolyte solution and the uppermost face of the negative electrode layer are preferably within the range of 1 to 30 mm, more preferably within the range of 3 to 10 mm. Further, preferably, the amount by which the volume of each electrode changes upon power discharge or upon power discharge and power charge is measured or calculated in advance, and the initial amount of the electrolyte solution is set to an appropriate amount based on the measured or calculated amount of change in the volume of each electrode.

Further, the shape of the electrode members used in this example embodiment of the invention (i.e., the air electrode, the negative electrode, and the separator) are not limited to any specific shapes. For example, they may be flat, cylindrical, or rolled up.

(2) Next, the arrangement of the depressurization portion will be described. The depressurization portion of the example embodiment is a portion operable to reduce the internal pressure of the sealed air battery cell to below the atmospheric pressure.

The gas-drawing portion of the depressurization portion may be arranged at any position as long as gas can be properly drawn from the sealed air battery cell via the gas-drawing portion. However, the gas-drawing portion is normally arranged at a position higher than the surface of the electrolyte solution. As already mentioned in (1) above, in some cases, the level of the electrolyte solution changes as the volume of each electrode changes upon power discharge or upon power discharge and power charge. In view of this, the gas-drawing portion of the depressurization portion is preferably arranged at a position higher than the highest possible level of the electrolyte solution.

In the example embodiment of the invention, preferably, the depressurization portion may have a gas feedback portion operable to return the drawn gas back to the sealed air battery cell. Having the gas feedback portion, the depressurization portion achieves a high power charge efficiency by reducing the internal pressure of the sealed air battery cell upon power charge and achieves a high power discharge efficiency by increasing the internal pressure of the sealed air battery cell up to the original level upon power discharge. The gas feedback portion normally has at least a gas storage portion and optionally has, a pressure meter, a detector, an electromagnetic valve, and so on.

Figure 6:
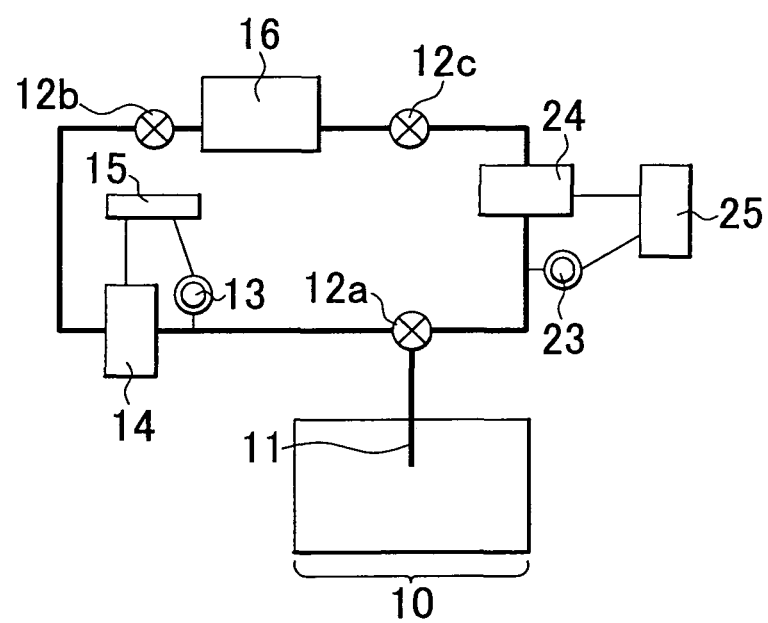
FIG. 6 is a view illustrating the configuration of an air battery system according to an example embodiment of the invention.

In this example embodiment of the invention, the pressurization portion, which will be described later, may be incorporated in the depressurization portion. In a case where the depressurization portion has the gas feedback portion, preferably, the pressurization portion is incorporated in the gas feedback portion of the depressurization portion. An example of such a depressurization portion is shown in FIG. 6. This depressurization portion has an electromagnetic valve 12a, the depressurization gauge 13, the depressurization pump 14, and the detector 15, which are arranged in this order from the hose 11. Further, the depressurization portion has an electrometric valve 12b and the gas storage portion 16, forming a gas feedback portion that delivers the gas stored in the gas storage portion 16 to the sealed air battery cell 10. This gas feedback portion has the pressurization gauge 23, the pressurization pump 24, the detector 25, and so on, which provide respective functions of a pressurization portion.

Figure 7:
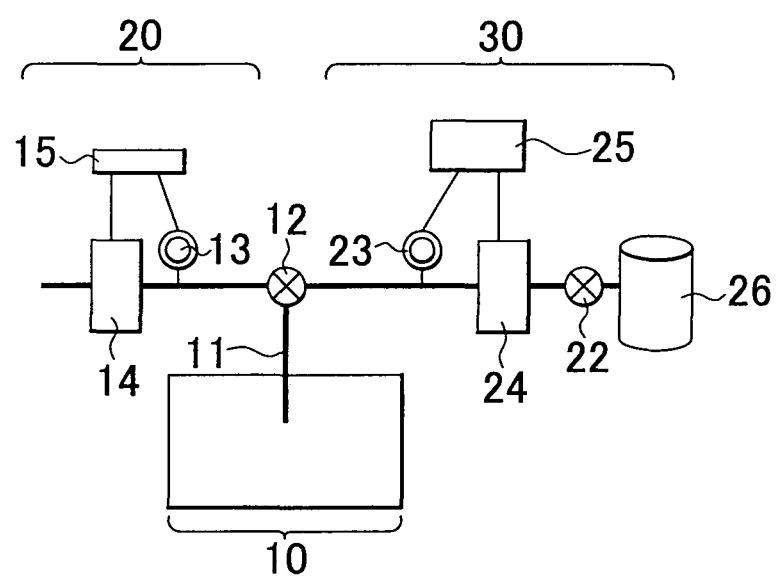
FIG. 7 is a view illustrating the configuration of an air battery system according to an example embodiment of the invention.

In this example embodiment of the invention, the gas-drawing portion of the depressurization portion may serve also as the gas supply portion of the pressurization portion. One example of such a gas-drawing portion is shown in FIG. 7. In the gas-drawing portion in FIG. 7, the gas-drawing portion 11 of the depressurization portion 20 serves also as the gas supply portion of the pressurization portion 30. According to this structure, the operation mode can be switched between the pressurization mode and the depressurization mode by switching the electromagnetic valve 12. Note that the elements in FIG. 7 that are identical to those identified by the same reference numerals in FIG. 1 are not described here again. If necessary, the depressurization portion may have two or more gas-drawing portions.

(3) Next, the arrangement of the pressurization portion will be described. The pressurization portion of the example embodiment is a portion that boosts the internal pressure of the sealed air battery cell using oxygen gas.

The gas supply portion of the pressurization portion may be arranged at any position as long as the pressurization portion can boost the internal pressure of the sealed air battery cell. In this example embodiment of the invention, further, the gas supply portion of the pressurization portion may either be arranged so as to be soaked in the electrolyte solution or so as not to be soaked in the electrolyte solution. However, in the example embodiment of the invention, the gas supply portion is arranged so as to be soaked in the electrolyte solution. That is, because the gas supply portion is soaked in the electrolyte solution, bubbling can be performed to boost the concentration of the oxygen dissolved in the electrolyte solution.

In a case where the gas supply portion of the pressurization portion is arranged so as to be soaked in the electrolyte solution, the gas supply portion is preferably provided with a bubble cutting potion to enable more efficient boosting of the concentration of dissolved oxygen.

The bubble cutting portion is not limited to any specific structure nor to any specific material as long as it can produce oxygen bubbles of a desired size. For example, a porous material having through pores or a member having slits may be used as the bubble cutting portion. An example of such a porous material is a bubbler having pores that create small bubbles from the gas passing therethrough. Likewise, in a case where a member having slits is used as the bubble cutting portion, small bubbles are created from the gas passing through the slits.

Further, as mentioned above, preferably, the oxygen bubbles created as described above are small. The diameters of oxygen bubbles are not limited to specific values. For example, preferably, oxygen bubbles measuring 200 µm or smaller in diameter are created, and more preferably, oxygen bubbles measuring 10 to 100 µm in diameter are created. Meanwhile, in general, bubbles measuring less than 50 µm in diameter are called "microbubbles", and bubbles measuring less than 1 µm in diameter are called "nanobubbles". In the example embodiment of the invention, the above-described oxygen bubbles may either be microbubbles (less than 50 µm but at least 1 µm in diameter) or nanobubbles (less than 1 µm in diameter). In a case where the oxygen bubbles are nanobubbles, their diameters are preferably with in the range of 50 to 500 nm.

Next, various methods for using the foregoing air battery systems of the example embodiment of the invention will be described.

First, a description will be made of an example embodiment that provides an air battery cell usage method characterized in reducing the internal pressure of the sealed air battery cell of the foregoing air battery system upon power charge. According to this method, by reducing the internal pressure of the sealed air battery cell upon power charge, the oxygen concentration in the cell is reduced, and thus the power charge efficiency improves.

This example embodiment of the invention also provides an air battery cell system usage method characterized in reducing the internal pressure of the sealed air battery cell when it is not operating. According to this method, by reducing the internal pressure of the sealed air battery cell when it is not operating, self-discharge from the seal air battery cell can be suppressed.

As such, based on this fact that the self-discharge can be suppressed by reducing the internal pressure of the sealed air battery cell when it is not operating, it is possible to provide a primary type air battery cell that is maintained in a depressurized state until the start of power discharge. That is, normally, primary type air battery cells of the related art have openings for taking in air (oxygen) from the outside and therefore the internal pressure in the sealed air-battery cell is equal to the atmospheric pressure. In this example embodiment of the invention, for example, when storing a primary type air battery cell having such gas intake openings, the openings are sealed by sealers and the internal pressure of the cell is then reduced in advance, and when power is discharged from the air battery cell for the first time (i.e., when the air battery starts to be used), the sealers are removed from the openings. In this case, thus, because the air battery cell is stored in a depressurized state, self-discharge from the air battery cell can be suppressed, and therefore it can be properly stored for a long period of time.

Further, the example embodiment of the invention also provides an air battery system usage method characterized in increasing the internal pressure of the foregoing air battery system upon power discharge so as to increase the concentration of oxygen dissolved in the electrolyte solution and thus to improve the power discharge efficiency.

In particular, in this example embodiment of the invention, preferably, the foregoing air battery system is used such that the internal pressure in the sealed air battery cell is reduced upon power charge and when the air battery system is not operating and such that the internal pressure in the sealed air battery cell is boosted upon power discharge. This achieves, a high power charge efficiency, suppresses self-discharge from the sealed air battery cell when the air battery system is not operating, and improves a high power discharge efficiency.

It is to be noted that the invention is not limited to any of the foregoing example embodiments. That is, the foregoing example embodiments are only exemplary, and the invention is intended to cover any structures and methods that are substantially equivalent to those described in the claims of the invention or that provide effects or advantages substantially equivalent to those obtained with the structures and methods described in the claims of the invention.

Hereinafter, a concrete example of the invention will be described with reference to FIG. 1 and FIG. 2A. In this example, an air battery cell was assembled in an argon box. First, the negative electrode power collector 2, which is a nickel mesh (150 µm in thickness and 40 mm in diameter), was put on the inner side of a lower insulative case 1a measuring 80 mm in diameter and made of Teflon (registered trademark). Then, the negative electrode lead 2' (made of nickel) is connected to the negative electrode power collector 2. The negative electrode lead 2' penetrates the lower insulative case 1a and protrudes to the outside. Then, the negative electrode layer 3 was put on the negative electrode power collector 2. The negative electrode layer 3 is a metal lithium foil that was produced by punching a piece measuring 20 mm in diameter out of a sheet having a thickness of 250 µm. The negative electrode layer 3 was press-fit on the mesh of the negative electrode power collector 2. Then, the separator 7 (made of polyethylene, 25 μm in thickness, 60 mm in diameter) was put at the middle level in the lower insulative case 1a, and an air electrode mesh 5 (made of nickel, 150 μm in thickness, 60 mm in diameter) and the air electrode layer 4 were put on the separator 7. The air electrode layer 4 was produced by mulling 80 pts.wt of Ketjen Black and 10 pts.wt of manganese dioxide in an agate mortar, then adding 10 pts.wt of polytetrafluoroethane (PTFE) into the mortar, and then mulling them in the mortar.

A thread is formed at the inner face of the lower insulative case 1a and it is meshed with a thread formed at the outer face of the upper insulative case 1b (made of Teflon (registered trademark), 60 mm in diameter). The air electrode power collector 6 (made of nickel and 2 mm in thickness) was attached at the front end of the upper insulative case 1b as, and the air electrode lead 6' was connected to the air electrode power collector 6. The upper insulative case 1b was fixed by the separator 7 and the air electrode mesh 5 being sandwiched between the upper insulative case 1b and the lower insulative case 1a. In this state, the air electrode power collector 6 and the air electrode mesh 5 contact each other. Then, the electrolyte solution 8 was injected to between the lower insulative case 1a and the upper insulative case 1b. The electrolyte solution 8 was produced as follows. First, a solvent was produced by mixing 30 pts.vol of ethylenecarbonate and 70 pts.vol of ethylmethylcarbonate and adding 1 $m^3$/mol of $LiPF_6$, which are electrolyte salts, to the solvent. The produced electrolyte solution 8 was injected up to the level 5 mm above the air electrode layer 4 while the air battery cell was kept level, so that the air electrode layer 4 was fully soaked in the electrolyte solution 8. Then, the negative electrode lead 2' was connected to the negative terminal, and the air electrode lead 6' was connected to the positive terminal.

Then, the hose 21 (6.35 mm in diameter, made of stainless steel) was attached such that the upper portion of the hose 21 penetrates the upper insulative case 1b, and the hose 21 was fixed using a fastener 27. Note that the hose 21 extends from the inside of the sealed air battery cell 10 to the pressurization gauge (pressure meter) 23 and to the pressurization pump 24 via the electromagnetic valve 22a. The pressurization gauge 23 is connected to the detector 25 such that the signals of the pressurization gauge 23 are transmitted to the pressurization pump 24. The pressurization pump 24 is connected to the gas storage portion for storing oxygen gas, and the like, via an electromagnetic valve 22b.

Next, the hose 11 was attached such that the upper portion of the hose 11 penetrates the upper insulative case 1b, and the hose 11 was fixed using a fastener 17. Note that the hose 11 extends from the inside of the sealed air battery cell 10 to the depressurization gauge (pressure meter) 13 and to the depressurization pump 14 via the electromagnetic valve 12a. The depressurization gauge 13 is connected to the detector 15 such that the signals of the depressurization gauge 13 are transmitted to the depressurization pump 14. The depressurization pump 14 is connected to the gas storage portion 16 for storing oxygen gas, and the like, via the electromagnetic valve 12c and gas is returned from the gas storage portion 16 to the sealed air battery cell 10 as needed.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A non-aqueous battery system, comprising;
    a sealed air battery cell having: an air electrode having an air electrode layer containing a conductive material and an air electrode power collector for collecting electric power from the air electrode layer; a negative electrode having a negative electrode layer containing a negative electrode active material that adsorbs and releases metal ions and a negative electrode power collector for collecting electric power from the negative electrode layer; a separator provided between the air electrode layer and the negative electrode layer; and a sealed air battery case;
    a depressurization portion that includes a first pump and a valve configured to open and close a passage, wherein the first pump of the depressurization portion reduces the internal pressure of the sealed air battery cell to below the atmospheric pressure;
    a gas feedback portion that returns the drawn gas to the sealed air battery cell, wherein the depressurization portion is adapted to draw gas from the sealed air battery cell; and
    a pressurization portion that includes a second pump that increases the internal pressure of the sealed air battery cell, wherein
    the pressurization portion is made active when electric power is discharged from the non-aqueous battery system, and wherein
    the depressurization portion is made active when the non-aqueous battery system is charged with electric power or when the non-aqueous battery system is not operating.

2. The non-aqueous battery system according to claim 1, wherein
    the gas feedback portion is made active when electric power is discharged from the non-aqueous battery system.

3. The non-aqueous battery system according to claim 1, wherein
    the gas feedback portion is connected to the depressurization portion.

4. The non-aqueous battery system according to claim 1, wherein
    an electrolyte solution is provided in the sealed air battery cell such that the air electrode layer and the negative electrode layer are always filled with the electrolyte solution regardless of a change in the volume of the air electrode and a change in the volume of the negative electrode.

5. The non-aqueous battery system according to claim 4, wherein
    the level of the electrolyte solution in the sealed air battery cell is set so as to be higher than the uppermost face of the air electrode layer and the uppermost face of the negative electrode layer even if the level of the electrolyte solution lowers down to a lowest level due to a change in the volume of the air electrode and due to a change in the volume of the negative electrode when the sealed air battery cell is being charged with electric power or when electric power is discharged from the sealed air battery cell.

6. A method for using the non-aqueous battery system according to claim 1, comprising:
- reducing the internal pressure of the sealed air battery cell when the non-aqueous battery system is charged with electric power; and
- boosting the internal pressure of the sealed air battery cell when electric power is discharged from the non-aqueous battery system.

7. A method for controlling a non-aqueous battery system incorporating a sealed air battery cell having: an air electrode having an air electrode layer containing a conductive material and an air electrode power collector for collecting electric power from the air electrode layer; a negative electrode having a negative electrode layer containing a negative electrode active material that adsorbs and releases metal ions and a negative electrode power collector for collecting electric power from the negative electrode layer; a separator provided between the air electrode layer and the negative electrode layer; a sealed air battery case, a depressurization portion that includes a first pump and a valve configured to open and close a passage, wherein the first pump of the depressurization portion reduces the internal pressure of the sealed air battery cell to below the atmospheric pressure; a gas feedback portion that returns the drawn gas to the sealed air battery cell, wherein the depressurization portion is adapted to draw gas from the sealed air battery cell; and a pressurization portion that includes a second pump that increases the internal pressure of the sealed air battery cell, the method comprising:

- reducing the internal pressure of the sealed air battery cell when the non-aqueous battery system is charged with electric power or when the non-aqueous battery system is not operating;
- boosting the internal pressure of the sealed air battery cell when electric power is discharged from the non-aqueous battery system;
- activating the pressurization portion when electric power is discharged from the non-aqueous battery system; and
- activating the depressurization portion when the non-aqueous battery system is charged with electric power or when the non-aqueous battery system is not operating.

8. The non-aqueous battery system according to claim 1, wherein the depressurization portion includes a depressurization gauge connected to a first detector and the first pump, and wherein the pressurization portion includes a pressurization gauge connected to a second detector and the second pump.

9. The non-aqueous battery system according to claim 1, wherein the gas feedback portion includes a gas storage portion for containing gas discharged from the sealed air battery cell.

10. The non-aqueous battery system according to claim 1, wherein the pressurization portion includes a gas storage portion for containing a gas, and wherein the second pump is adapted to deliver the gas from the gas storage portion to the sealed air battery cell.

* * * * *